United States Patent [19]
Takase et al.

[11] 4,317,182
[45] Feb. 23, 1982

[54] SIGNAL AVERAGING DEVICE

[75] Inventors: Sadao Takase, Yokohama; Takeshi Fujishiro, Yokosuka, both of Japan

[73] Assignee: Nissan Motor Company, Limited, Yokohama, Japan

[21] Appl. No.: 125,791

[22] Filed: Feb. 29, 1980

[30] Foreign Application Priority Data

Mar. 1, 1979 [JP] Japan .................................. 54-22565

[51] Int. Cl.³ .......................... G06F 7/38; G06F 15/20
[52] U.S. Cl. .................................... 364/734; 123/488; 364/431.04
[58] Field of Search ........................ 364/734, 575, 431; 123/480, 488

[56] References Cited

U.S. PATENT DOCUMENTS

| 3,518,414 | 6/1970 | Goodman et al. | 364/734 X |
| 3,704,364 | 11/1972 | Roeschlein et al. | 364/734 X |
| 3,936,663 | 2/1976 | Taylor et al. | 364/734 |
| 4,137,568 | 1/1979 | Dlugos | 364/734 |
| 4,190,823 | 2/1980 | Leichle | 364/111 X |
| 4,193,118 | 3/1980 | Nash et al. | 364/734 |
| 4,199,812 | 4/1980 | Klötzner et al. | 364/431 |
| 4,209,829 | 6/1980 | Leichle | 364/431 X |

Primary Examiner—David H. Malzahn
Attorney, Agent, or Firm—Schwartz, Jeffery, Schwaab, Mack, Blumenthal & Koch

[57] ABSTRACT

In a control system for an internal combustion engine which receives a signal representing an operational parameter of the engine, a signal processor is disclosed which eliminates spurious signals. The processor comprises a memory which stores a plurality of sequential values of the signal, and an averager which averages at least some of the stored values and outputs the average as an output signal.

13 Claims, 4 Drawing Figures

SIGNAL AVERAGING DEVICE

BACKGROUND OF THE INVENTION

The present invention relates to the field of internal combustion engine control, and, more particularly, relates to the field of control of internal combustion engines in which sensors detect the current values of operating parameters of an internal combustion engine and feed output signals to a control device, which then processes these output signals and on this basis produces control signals which are fed to control devices of the engine.

Conventionally, it is known to provide sensors to an internal combustion engine which detect values associated with different operating parameters of the internal combustion engine, such as, for example, the flow rate of intake air to the engine, the rotational speed of the crankshaft, the operating temperature of the engine, and so forth. In such a system, these sensors produce sensor output signals representative of the detected values, and these sensor output signals are sent to a control device. Based upon the values of these sensor output signals the control device, produces control signals which are sent to control mechanisms of the engine to control various other operating parameters of the engine. For instance, such a control device can control the amount of fuel injected to the combustion chambers of the engine, or the ignition timing of the engine, or the rate of recirculation of exhuast gases to the inlet manifold of the engine.

As a particular example, a Karman vortex flow meter may be used to meter the flow of intake air into the engine inlet manifold. Such a flow meter produces a sensor output signal whose frequency corresponds to the flow rate of intake air. The control device detects the period of the sensor output signal of the Karman vortex flow meter in order to obtain information as to the intake air flow of the engine. This process can be performed in a short time, and is generally sufficiently accurate for operational purposes.

A problem often arises with such a system, however, in that interference or error in the sensor output signal from the sensor can disturb the correct operation of the control device. Such error of the output signal can occur for various reasons, such as electrical interference from the ignition system or the like, disturbance of the sensor by vibration or even by ionizing radiation, or the like. The error in the output signal may consist of a deformed waveform, or even of the absence of one or more control pulses, which, in a frequency-modulated system such as that outlined above, can produce an error which is large in magnitude. The incidence of such errors can be reduced by provision of shielding, filtering, and so on. However, it is impossible to remove them entirely. Such errors may well greatly interfere with smooth control of the engine. For example, in the particular example of a Karman vortex flow meter described above, when one or more peaks of the frequency-modulated sensor output signal are omitted, the amount of intake air provided by the control signal output from the control device may fluctuate wildly. This results in an unacceptable variation of air-fuel ratio provided to cylinders of the engine from the stoichiometric value, with associated problems relating to control of emission of harmful pollutants in the exhaust gases of the internal combustion engine, and/or relating to fuel consumption of the engine.

SUMMARY OF THE INVENTION

Therefore, it is an object of the present invention to provide a signal processor which reduces the effects of interference in a sensor output signal.

BRIEF DESCRIPTION OF THE DRAWINGS

The present invention will now be described with particular reference to several preferred embodiments thereof, and with reference to the appended illustrative drawings and diagrams, which, however, are not to be taken as limitative of the present invention, but which are given for the purposes of illustration and exemplification only. In the drawings.

DESCRIPTION OF THE PREFERRED EMBODIMENTS

Figure 1:
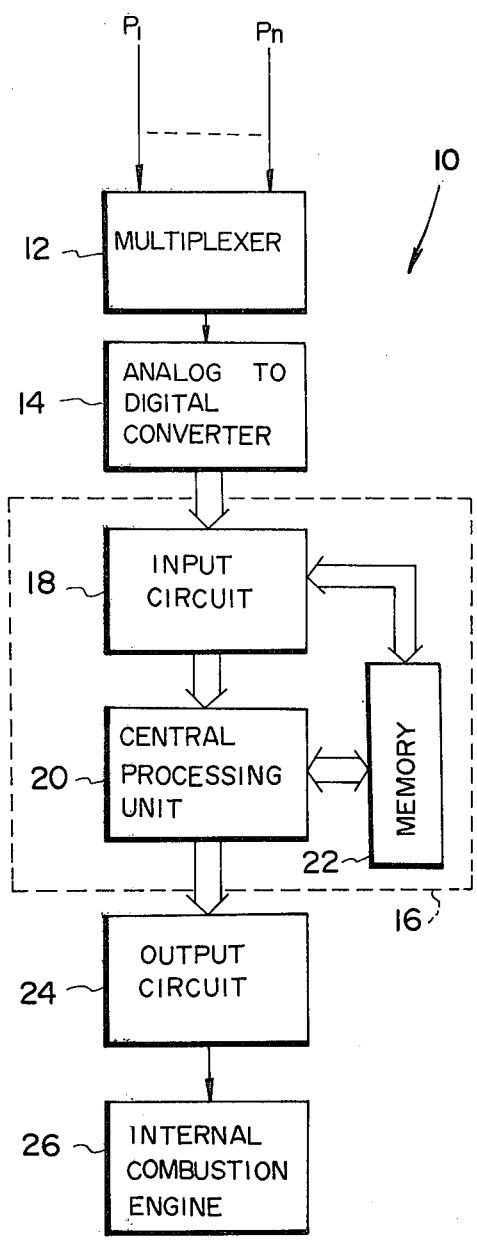
FIG. 1 is a block diagram of a control system which incorporates a signal processor according to the present invention.

Referring now to the drawings, and particularly to FIG. 1, there is shown a control system, generally designated by the numeral 10, to which, by way of example, the present invention is applied. A plurality of sensor output signals $P_1 \ldots P_n$ are received from n sensors (not shown), which detect various different operational parameters of an internal combustion engine 26. Output signals $P_1 \ldots P_n$ may be either in digital or analog form and supplied to a multiplexer 12 which sends them sequentially in a time-slicing mode to an analog-digital converter (hereinafter called the A/D converter) 14, in which those of these signals which are analog signals are converted to digital form. Of course, if the signals are digital signals, A/D converter 14, can be omitted. Further, if the input signals are in pulse form, a counter can be used as an A/D converter, as will be seen hereinafter.

The multiplexed signals from the A/D converter 14 are sent to a microcomputer apparatus generally designated as 16, which comprises an input circuit 18, a central processor unit 20, and a memory 22. The various elements of central processor unit 20 and memory 22 are per se well known, and comprise RAMs, ROMs, and so on.

An output circuit 24 receives control signals from microcomputer apparatus 16 and furnishes signals which control various operating parameters of internal combustion engine 26.

Figure 2:
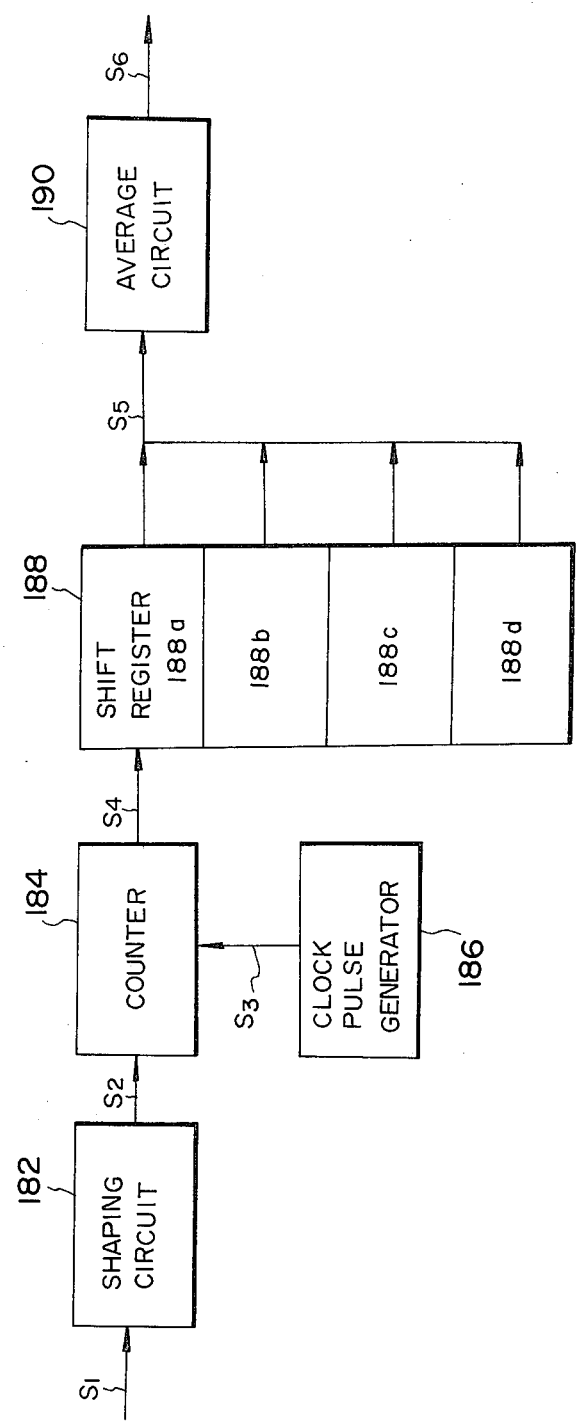
FIG. 2 is a block diagram of a first preferred embodiment of the present invention.

The present invention relates to a particular structure for input circuit 18 described above, and a first embodiment of which is shown in greater detail in FIG. 2. Input circuit 18 will be described with respect to its application to handling the signals emitted from a Karman vortex flow meter, but of course is capable of much wider application. A signal $S_1$ fed from the Karman vortex flow meter (not shown) through multiplexer 12 and A/D converter 14 is fed into the wave shaper 182. Wave shaper 182 outputs a signal $S_2$ whose frequency is inversely proportional to the flow rate of intake air into the intake manifold of internal combustion engine 26. Signal $S_2$ is fed as a trigger pulse to a counter 184. Counter 184 counts the number of clock pulses $S_3$ output from a clock pulse generator 186, and outputs its accumulated count each time it is triggered by a pulse level higher than a certain predetermined level of signal $S_2$. Thus, the digital value $S_4$ output from counter 184 is proportional to the period of signal $S_2$, and hence proportional to the intake air flow of the engine.

Particularly according to the present invention, a shift register 188 stores the signal $S_4$ every time it is produced, and shifts the stored counts progressively along its stages 188a, 188b, 188c, and 188d. More particularly, each time signal $S_4$ is fed to shift register 188, the contents of the third stage 188c are written into the fourth stage 188d, the contents of the second stage 188b are written into the third stage 188c, the contents of the first stage 188a are written into the second stage 188b, and the new value of $S_4$ is written into the first stage 188a. Thus, at all times during operation, the four most recent values of $S_4$ are available in the shift register 188, and are updated each time a new value of $S_4$ is produced by the counter 184, the oldest being lost.

An averaging circuit 190 selects values $S_5$ from the shift register 188—in this embodiment, it selects them all—and averages them to produce an averaged output $S_6$, which is fed to CPU 20 of FIG. 1 as a signal indicating the flow rate of intake air.

As seen from the above, the circuit of FIG. 2 averages the last four values of signals $S_2$ to produce output signal $S_6$, and thereby reduces and smooths out the effects of errors and interference such as noise.

Figure 3:
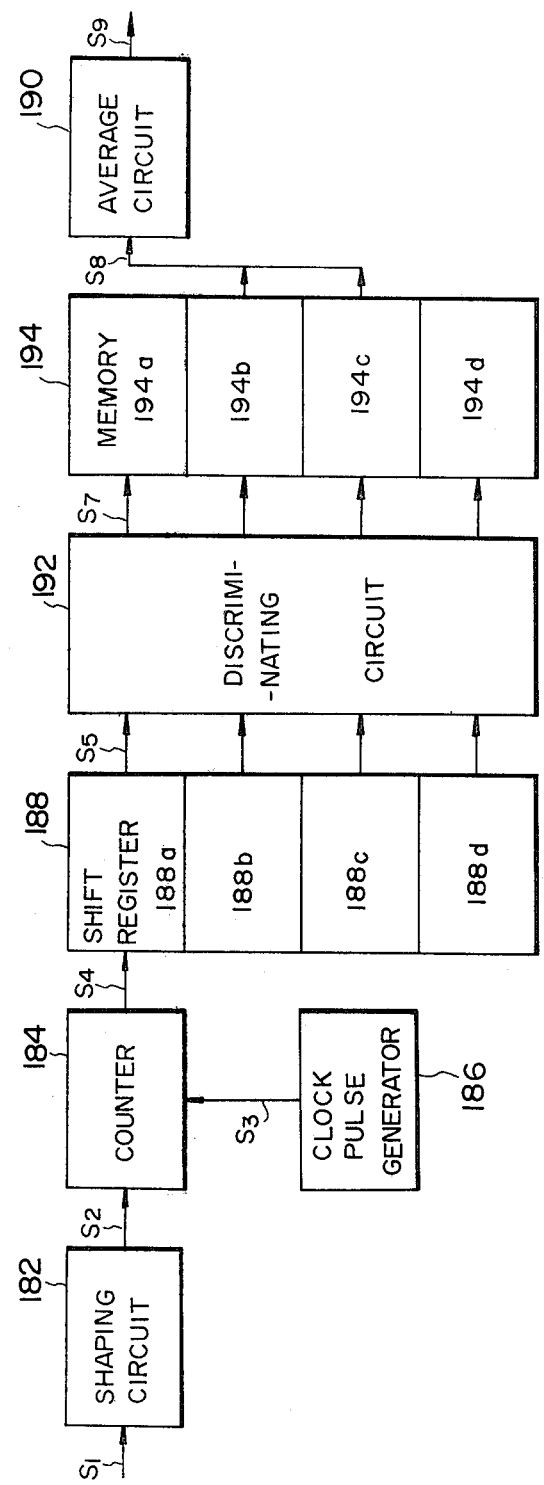
FIG. 3 is a block diagram, similar to FIG. 2, showing a second preferred embodiment of the present invention.

FIG. 3 shows in block diagram form a second preferred embodiment of the present invention, which takes advantage of the fact that interference or noise in the signal from the sensor is liable to create either an abnormally high or an abnormally low value. From the left hand side of FIG. 3, the operation is the same as that of the circuit of FIG. 2, up to and including the production of the signals $S_5$, which are the values of the most recent four counts output by the counter 184. A discriminating cicuit 192, which per se is well known in the art, rearranges signals $S_5$ in order of magnitude and outputs them as values $S_7$. Values $S_7$ are stored in memory 194 which may be part of the main memory 22. Signals $S_5$ are rearranged such that the one of the last four signals $S_5$ which is of maximum value is stored in the fourth address 194d, the one which is of minimum value is stored in the first address 194a, and the ones which are of intermediate values are stored in the intermediate addresses 194b and 194c. The values in addresses 194b and 194c are output as values $S_8$. Averaging circuit 190 then averages the values $S_8$ from in intermediate memory locations 194b and 194c, ignoring the extremely high value in the location 194d and the extremely low value in location 194a, and produces the averaged output $S_9$.

Thus, it is seen that the circuit of FIG. 3, by averaging only intermediate recent values of signal $S_4$, and by ignoring the highest and the lowest recent values thereof, has a tendency to avoid considering the very values which are likeliest to be in error. For example, when data are being processed in binary form, an error may well involve the most significant bit, or the second most significant bit. This produces an erroneous value which diviates greatly in absolute value, and which, but for the operation of the circuit of FIG. 3, would cause a severe mistake. However, according to the operation of the circuit of FIG. 3, such a value is not taken into consideration when performing the averaging process.

Figure 4:
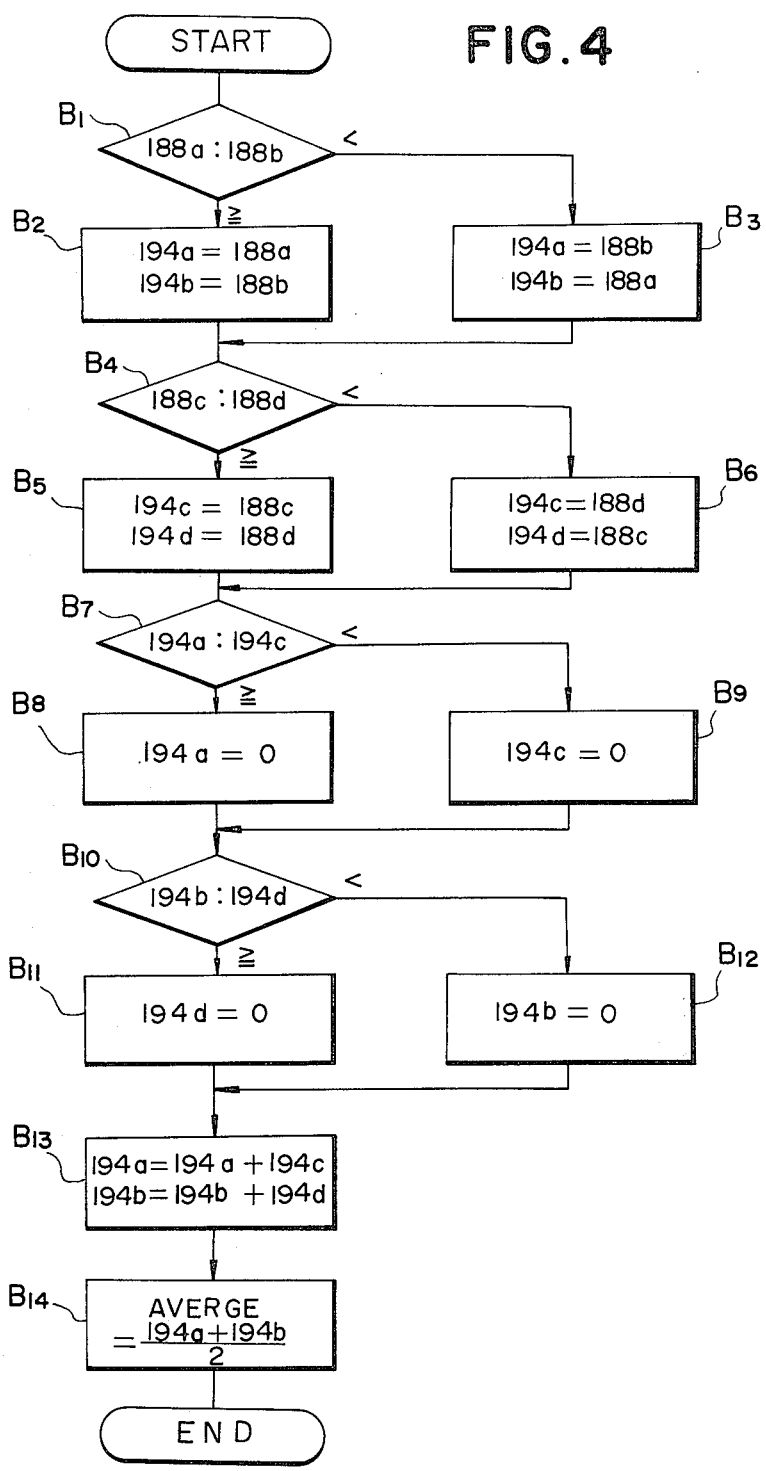
FIG. 4 is a flowchart, showing part of the operation of the embodiment shown in FIG. 3.

FIG. 4 is a flowchart which shows how a microcomputer can perform the functions associated with discriminating circuit 192, memory 194, and averaging circuit 190 of FIG. 3: In block $B_1$, the contents of first stage 188a of the shift register 188 is compared with the contents of second stage 188b, and in block $B_2$ or $B_3$ the larger of the two is written in first address 194a and the smaller in second address 194b. Then, in block $B_4$, the contents of third and the fourth stages 188c and 188d are compared with one another, and in block $B_5$ or $B_6$ the larger is written in third address 194c and the smaller in fourth address 194d. Then, in block $B_7$, the values stored in first address 194a and third address 194c are compared, and in block $B_8$ or $B_9$ the larger of the two is zeroed, thus erasing the largest of the four values that were originally stored in registers 188a–188d. Then, in block $B_{10}$, the contents of second address 194b and fourth address 194d are compared, and then in block $B_{11}$ or $B_{12}$ the smaller of the two is zeroed, whereby the smallest of the values originally stored in registers 188a–188d is erased. Then, in block $B_{13}$, the sum of the contents of first and third addresses 194a and 194c is written into address 194a, and the sum of the contents of the second and fourth addresses 194b and 194d is written into second address 194b. Finally, in block $B_{14}$, the average value of the contents of addresses 194a and 194b is calculated and output, and this is thus an average of the two intermediate values that were in registers 188a–188d, excluding the maximum and the minimum values.

Of course, the number of recent values of the signal which are averaged is not restricted to four; it could be higher. Further, in the system of FIG. 3, it is not necessary that only the highest and the lowest recent values of the signal be ignored. For instance, if eight recent values of the signal were stored in memory 194, it would be quite within the scope of the present invention for averaging circuit 190 to ignore the largest three and the smallest two of them, averaging the remaining three of the values which are intermediate in magnitude.

Further, it is quite within the scope of the present invention that the number of values stored, the number of values at the top and bottom end of the range which are neglected, and/or the number which are averaged should vary over time, perhaps according to the operational state of the internal combustion engine. For example, in the case of the output of a Karman vortex flow meter, which measures the flow rate of intake air, the production of Karman vortexes is disturbed by fluctuations in the intake of air when the throttle valve of the engine is substantially completely opened. This increases the occurrence of spurious output values. Therefore, if at such a time the number of signal values stored and averaged is increased, the accuracy of the output signal will be desirably improved, albeit at a penalty in response time of the system. On the other hand, if the number of stored values is decreased during operating states in which the error rate of the sensor and its associated systems is low, response time of the system will greatly improve. Thus, it is desirable that the capability of the shift registers 188a–188d and the memory 194 should include the posibility of changing the number of stages utilized according to the operational conditions of the internal combustion engine.

Although the applications described above are particularly suitable for processing the sensor output signals of a Karman vortex flow meter, the present invention is not to be restricted thereto, but can be applied to the processing of other signals. For example, if the signal $S_1$ is a analog signal, a sampling circuit can be used in place of counter 184, so as to sample signal $S_1$ at predetermined points in time.

Although the present invention has been shown and described with reference to particular embodiments thereof, and with reference to the illustrative drawings, it should not be conceived of as limited thereto; various alterations, omissions, and modifications to the form and the content of any particular embodiment could be made therein, without departing from the spirit of the invention, or from its scope; and it is therefore desired that this scope should be defined not by any particular features of the shown embodiments (which were given, as were the drawings, for the purposes of elucidation only), but solely by the accompanying claims.

What is claimed is:

1. In a control system for an internal combustion engine, the combination comprising:
    (a) a central processing unit for controlling various operating conditions of said engine; and
    (b) input circuit means for receiving sensor output signals indicative of various operating parameters of said engine, processing said signals and passing processed output signals to said central processing unit, said input circuit means comprising:
        (i) means for storing a predetermined number of sequential values of one of said sensor output signals; and
        (ii) means for averaging selected ones of said sequential values and passing an averaged value to said central processing unit as one of said processed output signals.

2. The invention as set forth in claim 1, wherein said input circuit means further includes circuit means for selecting certain of said sequential values based on relative magnitude, the selected relative magnitude values being said selected ones of said sequential values.

3. The invention as set forth in claim 2, wherein said circuit means for selecting comprises means for sorting and arranging said sequential values according to magnitude; and memory means for storing the arranged values in registers, said memory means having outputs connected from certain ones of said registers to said averaging means.

4. The invention as set forth in claim 3, wherein said certain ones of said registers store values intermediate the largest and smallest of said arranged values.

5. The invention as set forth in claims 1 or 4, wherein said one of said output signals is a signal indicative of the flow rate of intake air inhaled into said engine.

6. The invention as set forth in claim 1 and further including an analog to digital converter means for receiving an analog sensor output signal and producing a digital signal representative of the period thereof, said analog to digital converter means being connected to said input circuit means and said digital signal being one of said output signals received by said input circuit means.

7. The invention as set forth in claim 6, wherein said analog to digital converter means comprises a clock pulse generator for producing clock pulses, a counter for counting said clock pulses, said counter having a reset input for receiving said analog sensor output signal for resetting said counter when the value of said analog sensor output signal rises above a predetermined value.

8. A method of eliminating spurious input signals to the control system of an internal combustion engine comprising:
    receiving and storing a plurality of sequential values of a signal representing an operational parameter of said engine;
    rearranging and sorting said stored sequential values according to magnitude;
    storing said sorted values; and
    averaging selected ones of said sorted stored values.

9. The method as set forth in claim 8, wherein the step of averaging includes selecting from the stored sorted values a set which consists of all the stored values except for the first m thereof which are largest and the first n thereof which are smallest, and averaging the selected set, m and n being positive integers greater than or equal to zero.

10. The method as set forth in claim 8 or 9, wherein the step of receiving and storing comprises the step of receiving a signal representative of the flow rate of intake air inhaled into the inlet system of said engine.

11. The method as set forth in claim 10, wherein said step of receiving and storing further includes the step of converting said signal into a digital signal.

12. The method as set forth in claim 9 and further including the step of varying m and n according to the operational conditions of said engine.

13. In a control system, for an internal combustion engine, which receives a signal representing an operational parameter of the engine,
    a signal averaging device, comprising:
    a first memory for receiving and storing a plurality of sequential values of the signal;
    a rearranger coupled to the first memory for receiving the plurality of sequential values from the first memory to sort them according to magnitude;
    a second memory coupled to the rearranger for storing the sorted values; and
    an averager coupled to the second memory for extracting values from the second memory to average them.

* * * * *